Figure 1:
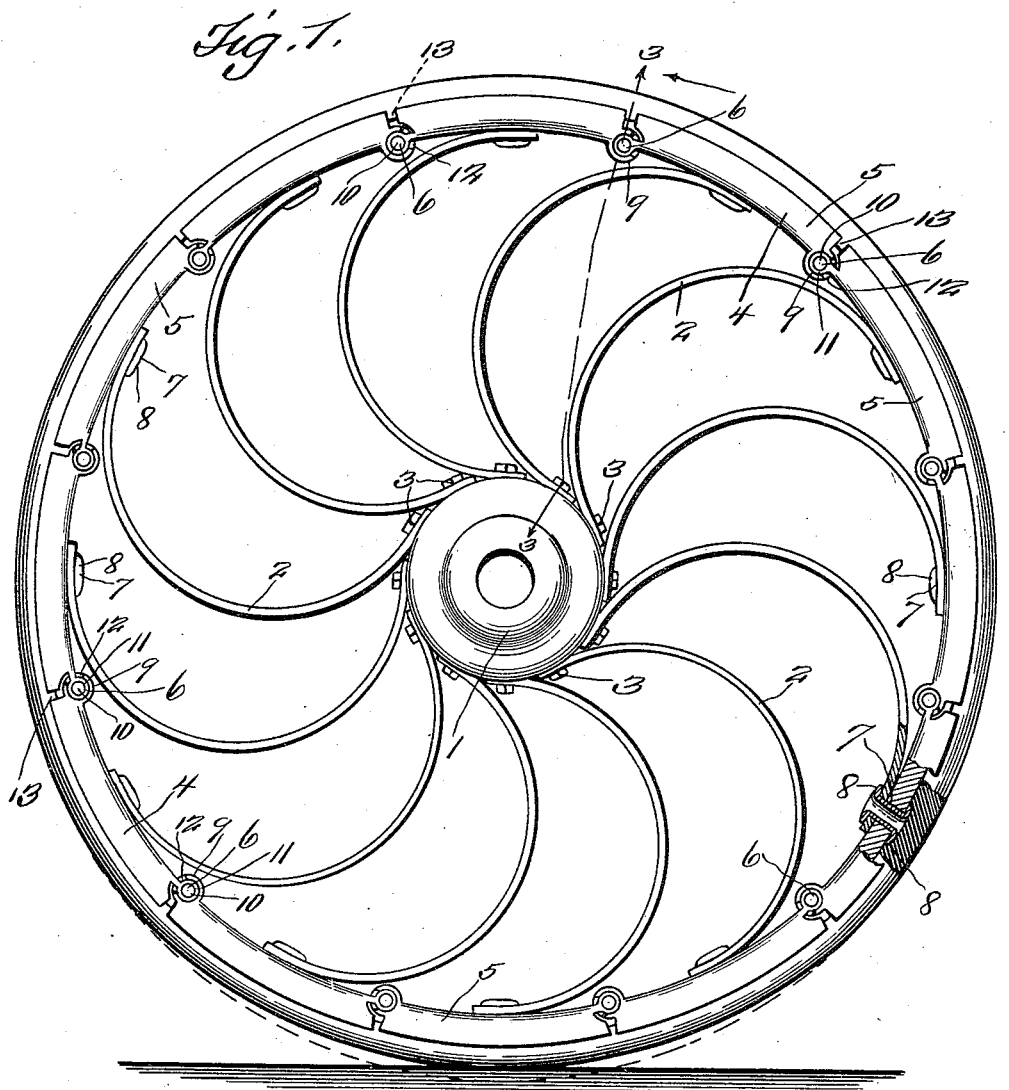

E. RADKE.
RESILIENT WHEEL.
APPLICATION FILED DEC. 16, 1911.

1,065,080.

Patented June 17, 1913.

2 SHEETS—SHEET 1.

Witnesses
Francis G. Boswell.
C. E. Frothingham.

Inventor
Emil Radke,
By D. Swift & Co.
Attorney

E. RADKE.
RESILIENT WHEEL.
APPLICATION FILED DEC. 16, 1911.
1,065,080.
Patented June 17, 1913.
2 SHEETS—SHEET 2.
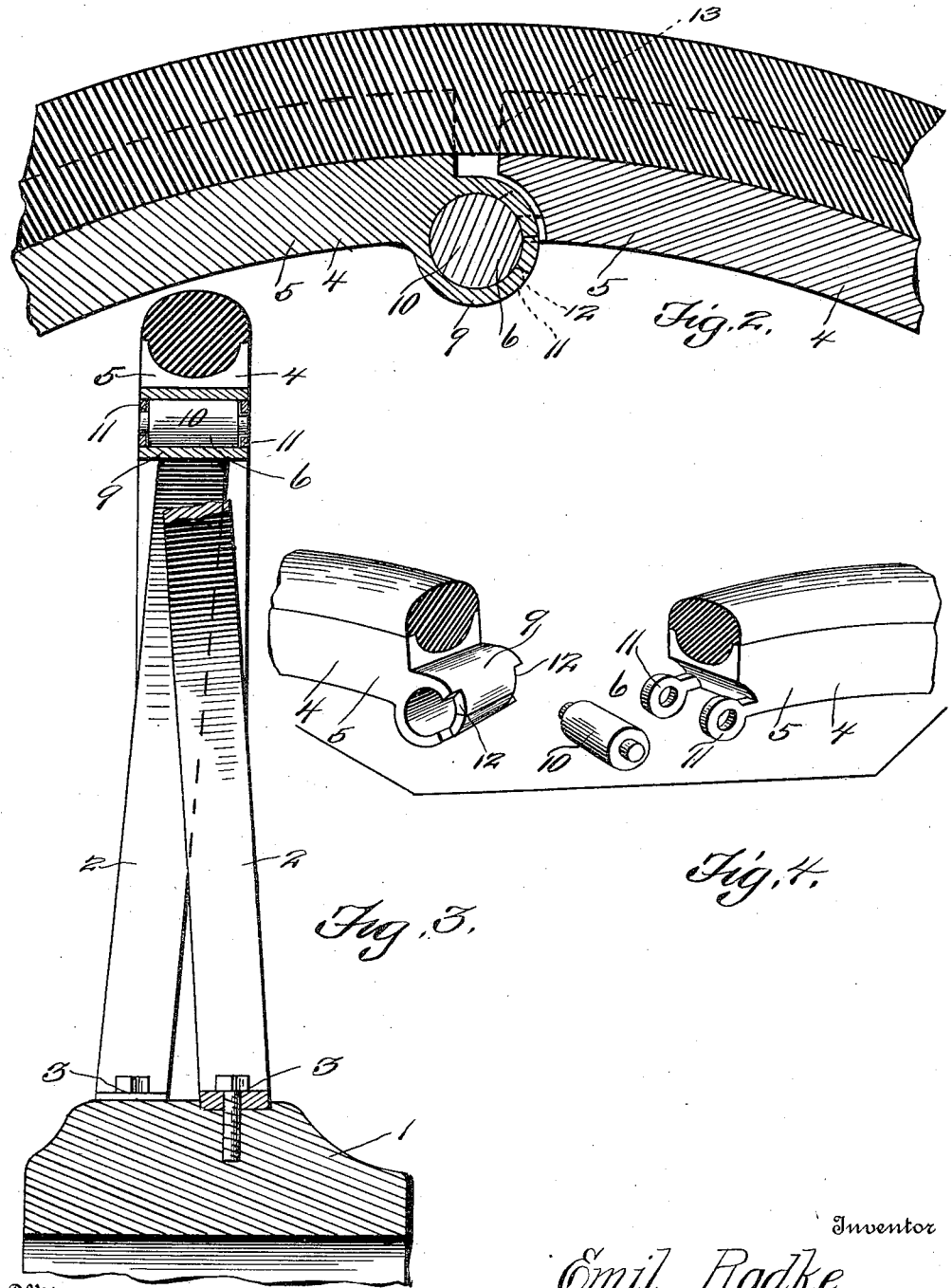
Witnesses
Francis T. Boswell,
C. E. Frothingham.
Inventor
Emil Radke,
By D. Swift & Co.
Attorney

UNITED STATES PATENT OFFICE.

EMIL RADKE, OF BLUE EARTH, MINNESOTA.

RESILIENT WHEEL.

1,065,080.  Specification of Letters Patent.  Patented June 17, 1913.

Application filed December 16, 1911. Serial No. 666,131.

*To all whom it may concern:*

Be it known that I, EMIL RADKE, a citizen of the United States, residing at Blue Earth, in the county of Faribault and State of Minnesota, have invented a new and useful Resilient Wheel; and I do hereby declare the following to be a full, clear, and exact description of the invention, such as will enable others skilled in the art to which is appertains to make and use the same.

This invention relates to a new and useful resilient wheel.

The main feature of construction of this improved resilient wheel is the provision of a sectional rim, which sections are hinged together in sequence, there being a spring spoke, semi-circular in elevation, bearing between each section and the hub of the wheel.

The invention comprises further features and combination of parts, as hereinafter set forth, shown in the drawings and claimed.

In the drawings: Figure 1 is a view in elevation of a resilient wheel constructed in accordance with the invention. Fig. 2 is an enlarged detail sectional view of a portion of the sectional rim. Fig. 3 is a transverse sectional view on line 3—3 of Fig. 1. Fig. 4 is a view showing the adjacent ends of two sections of the wheel rim disassembled from one another.

Referring more especially to the drawings 1 designates the hub of the wheel, to which the spokes 2 are connected, as shown at 3. The spokes 2 are semi-circular in elevation, as shown in Fig. 1. The rim 4 of the wheel is constructed of a plurality of sections 5, which are joined or hinged in sequence, as shown at 6. The sections 5 may be constructed of any suitable material, for instance metal or the like, and to which the outer ends of the spokes are connected by the sleeves 7 which are riveted as shown at 8, thus firmly connecting the spokes to the sections, so as to not be displaced laterally. The end portions of the spokes which connect to the hub of the wheel are alternately offset laterally with relation to one another, thereby obviating the chances of the wheel becoming dished. The hinge joint 6 between each of the sections 5 of the rim comprise the rolls or sleeves 9, which fit the pins 10. The pins 10 are secured in the ears 11 of one end of each section, while the rolls or sleeves 9 are formed with the opposite end of each section. The rolls or sleeves 9 at their ends are recessed as shown at 12, in which the end portions of the sections which carry the pins have limited movements, thus preventing the sections from flexing too much, as the wheel is traveling. The ends of the sections are slightly spaced apart as shown at 13, so as to permit the sections to have certain free movements, when one or the other of the spokes are under tension, as shown in Fig. 1.

In assembling the sections 5 the ears 11 are bent sufficiently outwardly, and when the adjacent ends of two sections are brought together, the ears 11 are in registration with the opening of the sleeve 9. The ears are then pressed sufficiently inwardly toward one another in order to enter the sleeve in the manner shown, the narrow neck portions of the ears having a limited movement in the recesses 12.

From the foregoing it is to be observed that there has been devised a simple, novel and efficient resilient wheel, and one which has been found practical, for the same comprises strength, durability and resiliency, and further, one which will not become dished.

The invention having been set forth, what is claimed as new and useful is:

In a resilient wheel having a hub provided with spring spokes semi-circular in elevation, a rim to which the spokes are secured, said rim comprising a plurality of sections arranged in sequence, one end of each section having diametrically opposite apertured circular ears, said ears having narrow neck portions connecting to each section, the other end of each section terminating in a sleeve roll disposed axially in the ends of which the circular ears are snugly but movably fitted, the ends of the sleeve roll are provided with segmental recesses, in which narrow neck portions have limit movement, and a roll pin fitting the sleeve roll and provided with reduced ends to enter the apertures of said ears.

In testimony whereof I have signed my name to this specification in the presence of two subscribing witnesses.

EMIL RADKE.

Witnesses:
JOHN DOMER,
ZELLA FLANAGAN.

Copies of this patent may be obtained for five cents each, by addressing the "Commissioner of Patents, Washington, D. C."